United States Patent

[11] 3,595,591

| [72] | Inventors | Roland G. Koch; |
| | | Earl O. Brechtelsbauer, both of |
| | | Frankenmuth, Mich. |
| [21] | Appl. No. | 793,073 |
| [22] | Filed | Jan. 22, 1969 |
| [45] | Patented | July 27, 1971 |
| [73] | Assignee | Houdaille Industries Inc. |
| | | Buffalo, N.Y. |

[54] FLOATING TOOL HOLDER
8 Claims, 5 Drawing Figs.

[52] U.S. Cl. ............................................. 279/16, 64/31
[51] Int. Cl. .............................................. B23b 31/08
[50] Field of Search ................................. 279/16, 17, 18, 42; 64/31

[56] References Cited
UNITED STATES PATENTS
1,041,858  10/1912  Normoyle ............... 279/42 UX
3,491,625  1/1970  Schulze ..................... 279/16 X Primary Examiner—Andrew R. Juhasz
Assistant Examiner—Donald D. Evenson
Attorney—Hill, Sherman, Meroni, Gross & Simpson ABSTRACT: Nonrigid connection between the shank and nose portion of a toolholder for compensating for misalignment in parallelism between a workpiece and the toolholder. The shank and nose are connected by means of an annular driver having two pairs of diametrically opposed slots displaced 90° from one another, two pairs of dowel pins fixed to the shank and the nose, and two pair of rolls journaled on the dowel pins and engageable with the slots of the annular driver. The annular driver has a small amount of radial clearance with the shank and nose of the toolholder and is enclosed with a small amount of radial clearance in a hollow body having one end fixed to a flange on the shank and the other end flanged so as to radially overlap a flange on the nose, whereby the nose is retained in position on the shank.

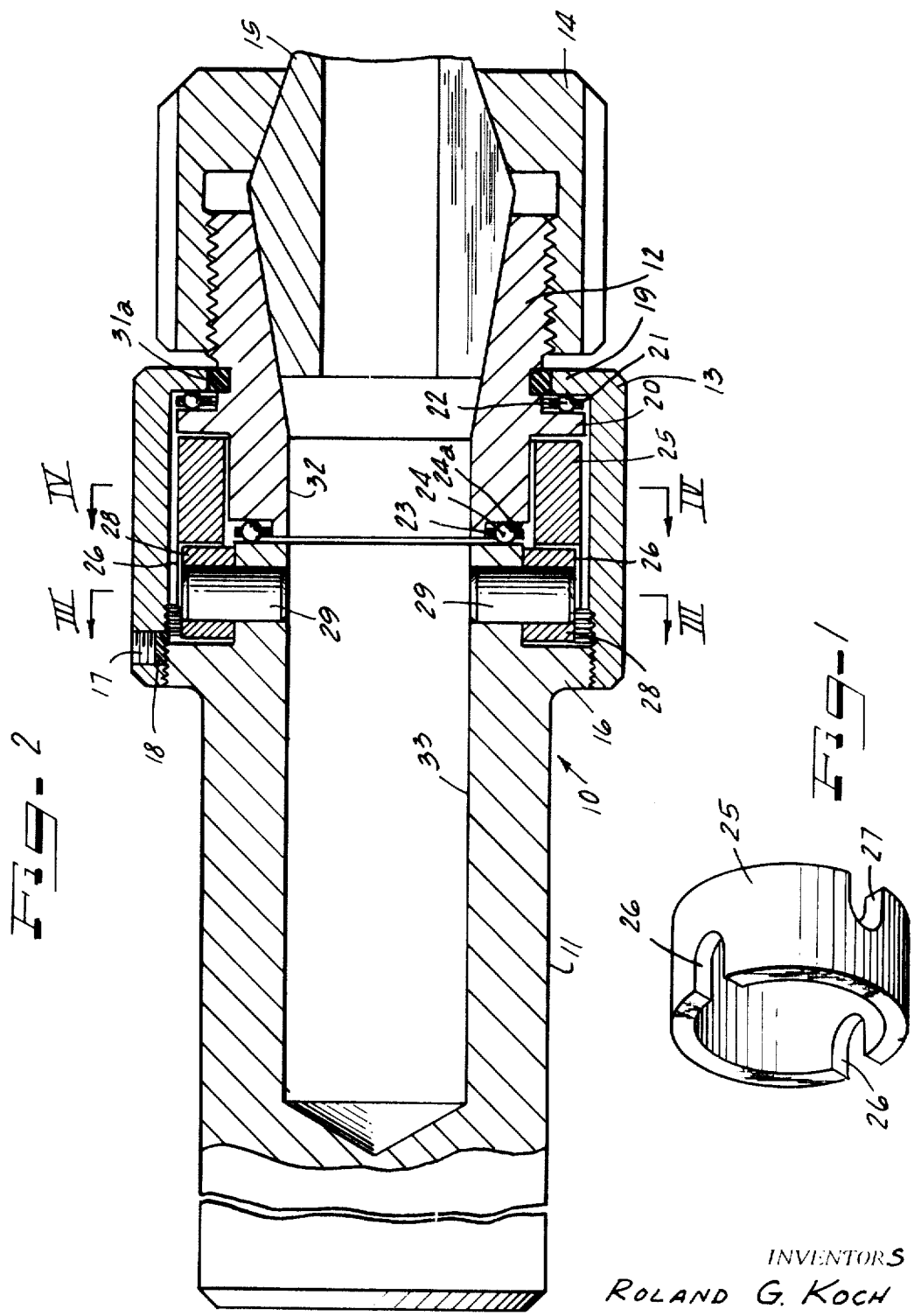

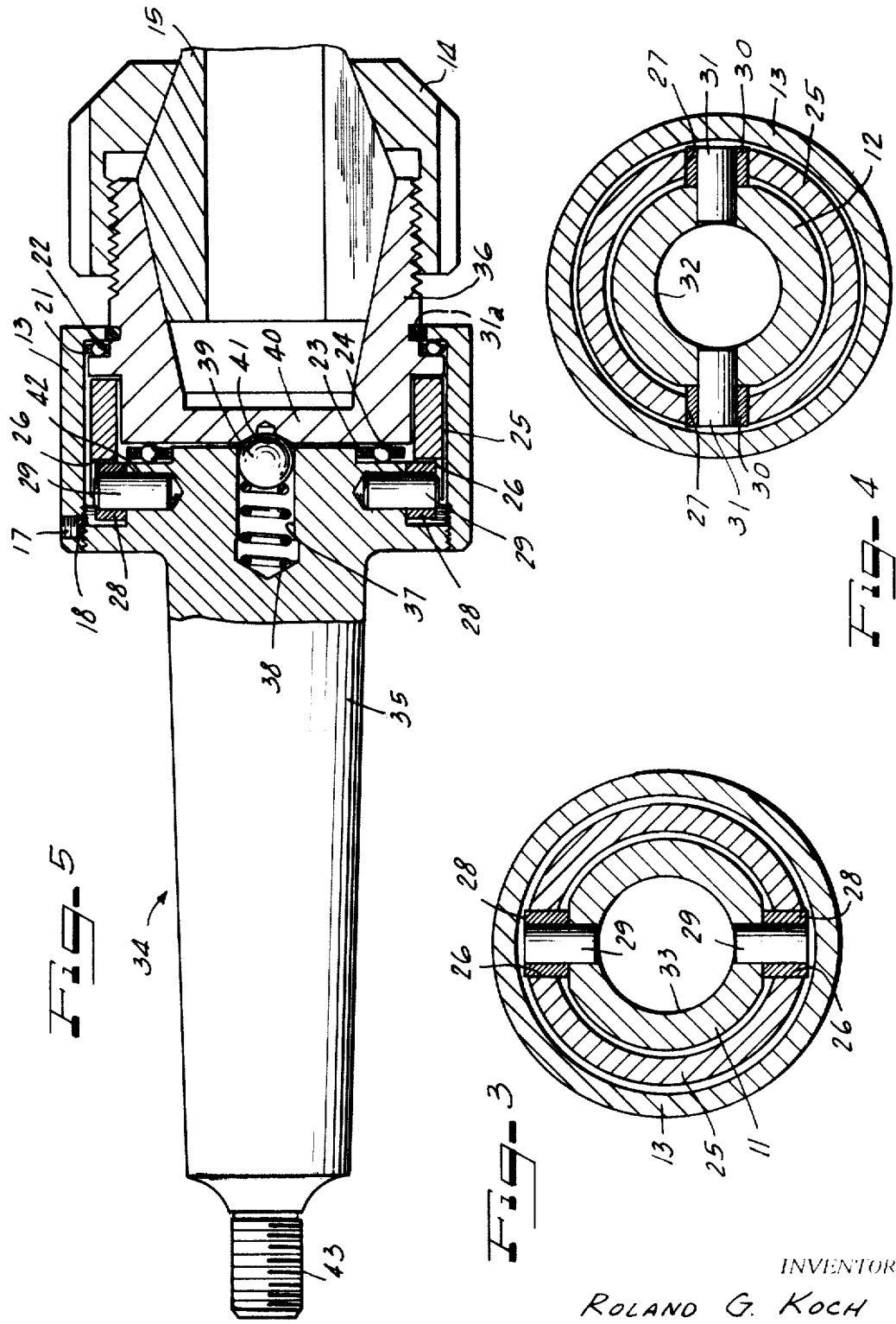

FLOATING TOOL HOLDER

BACKGROUND OF THE INVENTION

This invention relates to a floating toolholder. More specifically it relates to a nonrigid mounting between the shank and nose portion of the toolholder.

It is desirable in certain machining operations, for reaming, tapping, and counterboring, to provide a flexible mounting for a tool in a toolholder so that when any of the aforesaid operations is to be performed on an existing hole, misalignment in parallelism between the hole and the tool will not result in the formation of part of a new hole somewhat displaced from the existing hole, instead of the desired finishing operation on the old hole. Misalignment can occur, of course, between the workpiece and a toolholder with a change from one machine to another, with a change in tools, or with change from from one position or station to another on a single machine. It is known to provide mountings for tools on their holders which mountings allow misalignment of tools and holders without pivoting, but such mountings either have lacked flexibility or have at times been insufficient for both driving and thrust loads.

An object of the present invention is to provide an improved mounting for a tool upon a holder by which the aforesaid difficulties are avoided.

A further object is to provide a connection between a nose and shank of a toolholder which will readily compensate for axial misalignment of the tool with the hole upon which it is to perform an operation and is also strong enough to transmit adequate driving and thrust loads between the tool and the holder.

Other objects, features, and advantages of the present invention will become apparent to those skilled in the art from the drawing and the detailed description relating thereto.

SUMMARY OF THE INVENTION

A floating toolholder comprises an annular driver having two pairs of diametrally opposed slots at its ends 90° apart, two pairs of dowel pins fixed in a shank and a nose of the holder, and two pairs of rolls journalled on the dowel pins and engaged by the slots, there being radial play between the annular driver and the shank.

BRIEF DESCRIPTION OF THE DRAWING

FIG. 1 is a perspective view of an annular driver forming a part of the floating toolholder of the present invention;

FIG. 2 is a longitudinal sectional view, partly in elevation, of one form of a toolholder of the present invention;

FIG. 3 is a transverse sectional view taken on the line III—III of FIG. 2 and illustrating the driving connection between the annular driver and the shank of the toolholder;

FIG. 4 is a transverse sectional view taken on the line IV—IV of FIG. 2 and showing the driving connection between the annular driver of FIG. 2 and showing the driving connection between the annular driver and the nose of the holder; and FIG. 5 is a longitudinal sectional view, partly in elevation, of a modified form of toolholder of the present invention.

DESCRIPTION OF THE PREFERRED EMBODIMENTS

The reference character 10 designates a first type of toolholder shown in FIG. 2. The holder 10 comprises a shank 11, a chuck body or nose 12 aligned with the shank 11, a hollow body or annular sleeve 13 retaining the chuck body or nose 12 against the shank 11, a nut 14 threaded on the chuck body or nose 12, and a split collet 15 received in and engaged by the chuck body or nose 12 and the nut 14. The shank 11 has an outwardly directed flange 16 near but somewhat spaced from the end of the shank 11 where the nose 12 is located. The shank 11 is shown as having a conventional mounting portion or straight cylindrical exterior from the flange 16 to the end remote from the nose 12, although other conventional configurations suitable for attachment to various types of toolholding means on various types of machines may be used. One end of the hollow body 13 is threaded over the flange 16 and is secured thereto against rotation by means of a socketed setscrew 17 threaded through the hollow body 13 and a fiber pad 18 between the flange 16 and the inner end of the setscrew 17.

The end of the hollow body 13 opposite that threaded on the flange 16 of the shank 11 carries an inwardly directed flange 19 which radially overlaps in spaced relation an outwardly directed flange 20 formed on an intermediate region of the nose 12. In the space between the flanges 19 and 20 is positioned an annular retainer 21 and a set of balls 22 peripherally spaced from one another about the retainer 21 and mounted in openings therein, jointly comprising a ball retainer assembly. The balls 22 engage the flanges 19 and 20 so as to transmit restraining force therebetween. An annular retainer 23 and a set of balls 24 peripherally spaced from one another about the retainer 23 and mounted in openings therein are positioned as a ball retainer assembly in an annular space defined at one end by a shoulder 24a on the nose 12 set back from the end thereof adjacent the shank 11. The balls 24 are engaged by the shank 11 and the nose 12 so as to transmit force therebetween.

As shown in FIG. 1, an annular driver 25 has at one end two diametrally opposed slots 26 and at the other end two diametrally opposed slots 27 which are displaced 90° from the slots 26. Only one slot 27 is shown in FIG. 1, but both slots 27 appear in FIG. 4.

As shown in FIGS. 2, 3, and 4, the annular driver 25 has a small amount of radial clearance with respect to the shank 11, the nose 12, and the hollow body 13. As shown in FIGS. 2 and 3, the slots 26 in the annular driver 25 are engaged by a pair of rolls 28 journalled on a pair of diametrally opposed dowel pins 29 which are fixed in openings in the shank 11 and extend radially outwardly therefrom.

As shown in FIG. 4, the slots 27 in the annular driver 25 are engaged by a pair of rolls 30 journalled on a pair of diametrally opposed dowel pins 31 which are fixed in openings in the nose 12 and extend radially outwardly therefrom.

A resilient O-ring seal 31a is positioned in an external annular groove on the nose and is immediately adjacent the inner end of the flange 19 of the hollow body 13 so as to cooperate with said flange to prevent the entry of foreign matter into the space enclosed between the hollow body 13, the nose 12 and the shank 11.

The exterior of the collet 15 has two conical surfaces that taper in opposite directions and are engaged by internal conical surfaces in the nose 12 and the nut 14. Adjusting the nut 14 in one direction with respect to nose 12 makes the collet 15 grip a tool (not shown); adjusting the nut 14 in the opposite direction loosens the grip of the collet on the tool. The adjustment of the nut 14 on the nose 12 determines the size of the interior of the collet 15.

Rotation is transmitted from the shank 11 through the nose 12 and the split collet 15 to the tool therein. Rotation is transmitted between the shank 11 and the nose 12 through the pins 29, the rolls 28, the annular driver 25, the rolls 30, and the pins 31. The nose 12 and with it the tool in the collet 15 may pivot slightly with respect to the shank 11, because of the slots 26 and 27 and the rolls 28 and 30. At the same time, a certain amount of lateral adjustment, without pivoting, of the nose 12 with respect to the shank 11 may occur, because the annular driver 25 has radial clearance with respect to the shank 11 and the nose 12, as well as the hollow body 13. Pivoting of the nose 12 and the tool with respect to the shank 11 is substantially prevented, because the ball bearings 24 are engaged by one end of the shank 11 and the shoulder at the adjacent end of the nose 12 and the ball bearings 22 are engaged by the flange 20 on the nose 12 and the flange 19 on the hollow body 13 securely fastened to the shank 11. Thus the tool in the collet 15 may be misaligned with respect to the shank 11 and still perform a satisfactory finishing operation in a hole in a workpiece which may be axially misaligned with respect to the shank 11. Yet there is no interference with the ability to transmit torque from the shank 11 to the tool, for the rollers 28 and 30 and the annular driver 25 compensate for misalignment while delivering substantially constant velocity to the tool. The balls 22 and 24 transmit thrust between the shank 11 and the nose 12 without interfering with the ability of the nose 12 to move laterally to provide compensation for misalignment.

As shown in FIG. 2, the nose 12 has an opening 32 at the end adjacent the shank 11, and the shank 11 has a deep bore 33 extending in alignment with the opening 32 from the end of the shank adjacent the nose 12. Thus, the tool holder 11 can accommodate a tool that extends for an appreciable distance beyond the portion gripped by the collet 15.

As shown in FIG. 5, a modified form of tool holder 34 comprises a shank 35 and a nose 36. The shank 35 has a short bore 37 of small diameter accommodating a coil spring 38 and a ball 39. The nose 36 has a closed end 40 which is adjacent the shank 35 and is provided with a shallow recess 41 engaged by the ball 39. The ball 39 and recess 41 tend to center the nose 36 in the shank 35. The annular retainer 23 and the balls 24 mounted therein are positioned in an annular space defined at one end by the end 40 of the nose 36 and at the other end by a shoulder 42 on the shank 35 set back from the end thereof adjacent the nose 36. The shank 35 has a reduced threaded portion 43 at the end remote from the nose 36. The exterior of the shank between the flange 16 and the reduced threaded portion 43 has a Morse taper. The reduced threaded portion 43 and the Morse taper adapt the shank 35 for attachment to certain types of machines as will be apparent to those skilled in the art.

It should be understood that the illustrated embodiments case of the invention have been used for illustrative purposes only and that various modifications and variations in the invention may be effected without the departure from the spirit and scope of the invention.

We claim:

1. A floating toolholder comprising:
  a. a shank having an outwardly directed flange near one end;
  b. an annular sleeve secured at one end to said flange and projecting in spaced relation to said shank beyond said one end thereof, and having an inwardly directed flange at its other end;
  c. a tool chuck assembly having a body aligned with said shank, one end of said chuck body being adjacent to said one end of said shank, said chuck body having an outwardly directed flange within said annular sleeve adjacent to said sleeve flange for retaining said chuck body adjacent to said shank;
  d. an annular driver located within said sleeve and loosely surrounding the portion of said shank between said flange and said one end thereof, the annular driver also loosely surrounding the end of said chuck body adjacent to said one end of the shank, the driver having at one end a first pair of slots and at the other end a second pair of slots;
  e. a first pair of driving means fixed in said portion of said shank, and disposed in said first pair of slots;
  f. a second pair of driving means fixed in said chuck body adjacent to said end thereof, and disposed in said second pair of slots;
  g. a first bearing means positioned between and engageable with said flanges on said annular sleeve and said chuck body; and
  h. a second bearing means positioned between and engageable with said one end of said shank and said one end of said chuck body.

2. A floating toolholder according to claim 1, comprising:
  a. an exterior annular groove on said chuck body opposite said flange on said annular sleeve; and
  b. a ring seal positioned in said groove directly adjacent the radially inward end of said flange so as to cooperate therewith in sealing the space enclosed between said annular sleeve, said chuck body and said shank.

3. A floating toolholder according to claim 1,
  a. said chuck body having an axial opening therethrough, said one end of said shank having a recess of considerable depth aligned with said opening in said chuck body, whereby a tool gripped directly by the chuck assembly may extend axially through said chuck assembly and into said recess in said shank;
  b. said second bearing means being received in an annular space defined at one end by said one end of the shank and a shoulder on said chuck body.

4. A floating toolholder according to claim 3 in which said shoulder on said chuck body is set back from said one end thereof.

5. A floating toolholder according to claim 1, in which
  a. said one end of said shank has a recess;
  b. a spring disposed in said recess;
  c. a ball partially disposed in said recess and urged by said spring outwardly thereof;
  d. said one end of said chuck body being closed and having a recess engaged by said ball; and
  e. said second bearing means being received in an annular space defined at one end by said one end of said chuck body and by a shoulder on said shank.

6. A floating toolholder according to claim 5 in which said shoulder on said shank is set back from said one end thereof.

7. A floating toolholder according to claim 1, comprising:
  a. means defining a pair of coaxial recesses respectively disposed in said shank and in said chuck body at the confronting ends thereof;
  b. a spring-loaded ball disposed in one of said recesses and partially received in the other of said recesses; and
  c. said second bearing means encircling the axis of said recesses.

8. A floating toolholder comprising:
  a. a shank having an outwardly directed flange near one end;
  b. an annular sleeve secured at one end to said flange and projecting in spaced relation to said shank beyond said one end thereof, and having an inwardly directed flange at its other end;
  c. a tool chuck assembly having a body aligned with said shank, one end of said chuck body being adjacent to said one end of said shank, said chuck body having an outwardly directed flange within said annular sleeve adjacent to said sleeve flange for retaining said chuck body adjacent to said shank;
  d. driver means within said annular sleeve for corotatably connecting said shank to said chuck body and for enabling radial displacement therebetween;
  e. an exterior annular groove on said chuck body opposite said flange on said annular sleeve; and
  f. a ring seal positioned in said groove directly adjacent to the radially inward end of said flange so as to cooperate therewith in sealing the space enclosed between said annular sleeve, said chuck body and said shank.

UNITED STATES PATENT OFFICE
CERTIFICATE OF CORRECTION

Patent No. 3,595,591      Dated July 27, 1971

Inventor(s) Roland G. Koch and Earl O. Brechtelsbauer

It is certified that error appears in the above-identified patent and that said Letters Patent are hereby corrected as shown below:

In line 7 of the Abstract, correct the spelling of "journalled".

Col. 1, line 8 delete "110" and insert --example--.

Col. 1, lines 56 and 57 delete "and showing the driving connection between the annular driver of Figure 2"

Col. 2, line 20 after "by" insert --the end of the shank 11 adjacent the nose 12 and at the other end by a--.

Col. 2, line 73 after "be" insert --axially--.

Col. 2, line 75 delete "axially".

Col. 3, line 33 delete "case".

Col. 3, line 51 after "said" insert --annular--.

Signed and sealed this 14th day of March 1972.

(SEAL)
Attest:

EDWARD M. FLETCHER, JR.
Attesting Officer

ROBERT GOTTSCHALK
Commissioner of Patents